United States Patent [19]

Phillips

[11] Patent Number: 5,282,895

[45] Date of Patent: Feb. 1, 1994

[54] STOP-LEAK FORMULATIONS WITH IMPROVED STORAGE STABILITY

[75] Inventor: Derek T. Phillips, Pinckney, Mich.

[73] Assignee: Petro-Lube, Inc., Whitmore Lake, Mich.

[21] Appl. No.: 812,728

[22] Filed: Dec. 23, 1991

[51] Int. Cl.$^5$ ............................................. C09K 3/12
[52] U.S. Cl. ........................................ 106/33; 252/72
[58] Field of Search ............................ 106/33; 252/72

[56] References Cited

U.S. PATENT DOCUMENTS

| | | | |
|---|---|---|---|
| Re. 24,094 | 11/1955 | Barton | 106/33 |
| 1,630,828 | 5/1926 | Campbell | 106/33 |
| 2,935,189 | 5/1957 | Barton | 206/47 |
| 3,034,998 | 5/1962 | Hatch | 260/17.4 |
| 3,322,548 | 5/1967 | Lasswell et al. | 106/33 |
| 3,616,896 | 11/1971 | Barton | 206/47 R |
| 3,692,549 | 9/1972 | Martin | 106/33 |
| 4,348,235 | 9/1982 | Lasswell et al. | 106/33 |
| 4,439,561 | 3/1984 | Barber | 524/13 |
| 4,524,158 | 6/1985 | Barber | 523/130 |
| 4,662,940 | 5/1987 | Monier | 106/33 |
| 4,872,911 | 10/1989 | Walley et al. | 106/33 |

Primary Examiner—Helene Klemanski
Assistant Examiner—Margaret Einsmann
Attorney, Agent, or Firm—Dykema Gossett

[57] ABSTRACT

An improved stop-leak formulation containing ground plant root material, glycol, and water is provided. The formulation can contain other additives such as corrosion inhibitors, lubricating agents, and the like. The stop-leak formulations exhibit significantly improved storage stability. Over extended storage periods, the plant root powder remains readily dispersible in the glycol/water mixture. Generally the stop-leak formulations contain 1 to 50 parts by weight plant root powder, 20 to 80 parts by weight glycol, and 100 parts by weight water. One preferred stop-leak formulation contains 15 to 30 parts by weight ginger root powder, 35 to 55 parts by weight diethylene glycol, and 100 parts by weight water.

25 Claims, No Drawings

STOP-LEAK FORMULATIONS WITH IMPROVED STORAGE STABILITY

FIELD OF THE INVENTION

This invention relates to stop-leak formulations which can be used to prevent or stop leaks in heat-exchange equipment containing a water-based heat exchange fluid. More particularly, this invention relates to stop-leak formulations which can be used to prevent or stop leaks in automobile radiators or cooling systems. The present stop-leak formulations have significantly improved storage stability or shelf life.

BACKGROUND OF THE INVENTION

Various plant root materials have been used as stop-leak additives since the early 1950s. For example, U.S. Pat. Re. No. 24,094 (based on U.S. Pat. No. 2,580,719) provides a stop-leak product containing ground plant roots and a water soluble cutting oil. This formulation, while effective in stopping leaks in an automobile radiator system, has significant drawbacks. Most importantly, this stop-leak product must be essentially anhydrous. If water is present in the formulation, the plant root material agglomerates and settles to the bottom of the container, thereby rendering it essentially unsuitable for its intended purpose. Thus, traces of water present in the formulation (whether in the formulation as originally manufactured or entering the formulation during storage) could significantly reduce the effective storage life of the product. Once the plant root material agglomerates and settles to the bottom of the container it cannot be readily dispersed in the soluble oil and, even if dispersed, it may not be effective in stopping leaks.

Several approaches have been taken to overcome the problems associated with the water sensitivity of the ground plant root and soluble oil formulations. U.S. Pat. No. 2,935,189 describes a packaging system whereby the plant root powder is mixed with soluble oil and then compressed and extruded as pellets. The pellets are then coated with polyvinyl alcohol to act as a binder and protective coating. The binder coating, about three or four mils thick, is soluble in water but insoluble in oil. The binder-coated pellets are then placed in a suitable container containing oil. In theory, the binder coating protects the active ingredients until the container contents are placed in a leaking radiator at which time the water in the radiator dissolves the binder coating. The released plant root powder is then available to stop the leak. Unfortunately, water present in the container or entering the container over time can attack or dissolve the binder coating and reach the water sensitive components. Thus, this approach reduces but does not eliminate problems associated with water sensitivity of the plant root stop-leak products. Stop-leak pellets produced in this manner still lack a sufficiently long shelf life. In addition, the volume of soluble oil required to produce and package these binder-coated pellets is significant and can, therefore, present a significant environmental problem for the use and disposal of such products. U.S. Pat. No. 3,034,998 describes a similar stop-leak formulation containing ground nut shells, castor oil, and polyvinyl alcohol. And U.S. Pat. No. 3,616,896 describes an elaborate package whereby one compartment contains the stop-leak material (i.e., plant root powder) and a second compartment contains an antifreeze liquid. The contents of two compartments are mixed together just prior to adding the formulation to a cooling system at the point of use.

Stop-leak pellets prepared by the process of U.S. Pat. No. 2,935,189 or by similar processes are currently available in the marketplace for adding to the cooling system of an automobile. The two-compartment system of U.S. Pat. No. 3,616,896 does not appear to have been widely accepted or used in the marketplace. The stop-leak pellets with the binder coating, although an improvement over previous stop-leak products, have not eliminated the problems associated with water sensitivity and have increased the environmental problems associated with use and ultimate disposal of such products.

Others have attempted to solve the water sensitivity problems associated with the ground plant root materials by preparing, storing, and selling the stop-leak product in the form of dry pellets. U.S. Pat. Nos. 3,322,548, 4,348,235, and 4,662,940 describe stop-leak formulations in the form of a dry pellet containing ginger rhizome flour, ground nut shells, and various other components. One or two of the dry pellets were to be added to the automobile system. Consumer acceptance of the dry pellet product has not been high.

Other stop-leak products have been developed using active ingredients other than the plant root materials. For example, U.S. Pat. No. 3,692,549 describes a stop-leak formulation containing flax meal, graphite powder, and aluminum powder as the active ingredients. And U.S. Pat. Nos. 4,439,561 and 4,524,158 use fibrillated fibers as the active ingredient. Preferred fibrillated fibers included synthetic polymers such as poly(imino-1,4-phenyleneiminoterephthaloyl). And U.S. Pat. No. 4,872,911 describes the use of tri-dimensional cross-linked superabsorbent hydrogels. These active ingredients and the stop-leak formulations containing them are generally more expensive than stop-leak products containing readily available plant root powders.

It is desirable, therefore, to provide stop-leak formulations containing plant root materials as the active ingredient and which are not water sensitive. It is also desirable to provide a stop-leak formulation with a long shelf life. It is also desirable to provide a stop-leak material which is essentially oil free. The stop-leak formulations of the present invention satisfy these requirements.

SUMMARY OF THE INVENTION

This invention relates to a stop-leak formulation which can be used to prevent or stop leaks in water-based heat exchange systems and which has significantly improved storage stability or shelf life. The stop-leak formulations of the present invention can be stored for long periods of time and still be effective when added to a leaking heat exchange system such as an automobile radiator or cooling system. The stop-leak formulations of the present invention contain plant root powder, a glycol which has a flash point greater than about 220° F. and which is completely miscible in the water present in the formulation, and water. The stop-leak formulations may also contain corrosion inhibitors, lubricants, pour point depressants, dyes, and the like.

With many of the prior art stop-leak formulations, water present within the container or entering the container during storage breaks down the pellets containing the active ingredients and causes the active ingredients to disperse and swell. The dispersed and swollen particles settle to the bottom of the container where they tend to agglomerate and form a non-dispersible, solid mass. The prior art formulations have, therefore, significantly reduced shelf life. The solid mass resulting from water contamination can usually only be broken up with intense agitation. And even when the solid mass is broken up, the stop-leak activity of the formulation is often significant reduced. In many instances, such water contaminated products are not suitable for their intended purpose of stopping leaks. Such defective materials will likely result in consumer dissatisfaction and significant product returns. Due to the limited storage life of the prior art stop-leak products, extensive and expensive distribution systems with elaborate stock rotation and return policies are required.

The present stop-leak formulations solve these problems by providing a shelf stable material which is stable in the presence of water. In fact, the present stop-leak formulations contain significant levels of water as formulated. The increased shelf life of the present formulations allows for prolonged storage prior to the point of sale. The increased shelf life also should simplify the product distribution system, reduce returns, and increase consumer satisfaction.

In addition to increased shelf life, the stop-leak formulations of the present invention offer a number significant advantages and improvements over the stop-leak formulations of the prior art. For example, the stop-leak formulations of this invention contain components which are environmentally safer than many of the stop-leak formulations of the prior art. Furthermore, the stop-leak formulations of the present invention are completely compatible with the antifreeze products used in automobile radiators and cooling systems. The prior art formulations use a water soluble oil as the diluent. This oil can present environmental problems during a breach of the cooling systems or upon disposal of the contents of the cooling system. This oil also tends to separate and float to the surface of water/glycol in the radiator. Many consumers, upon seeing the floating oil in their radiator system, may believe that the antifreeze material has lost its effectiveness and may replace the still effective antifreeze. The present stop-leak formulations do not contain oil, thereby avoiding these problems. The materials present in the present stop-leak formulations should readily break down into non-hazardous materials if released to the environment. And the present stop-leak formulations are compatible with antifreeze formulations and will not separate and float to the surface.

The active ingredient of the present stop-leak formulation, even after prolonged storage, is readily and easily dispersible. The active component is already present in the dispersible sizes and form needed for quick stop leak action. The pellets of the prior art formulations are required to break down into smaller particle sizes within the cooling system before they can become effective.

One object of the present invention is to provide a stop-leak formulation which has a long shelf life. Another object is to provide a stop-leak formulation which is environmentally safer that prior art formulations. Another object is to provide a stop-leak formulation which is completely compatible with antifreeze formulations. Still another object is to provide a stop-leak formulation where the active ingredient is present in the dispersible sizes required for quick stop leak action and where the active ingredient is readily dispersible.

Still another object is to provide an essentially oil-free, stop-leak formulation for use in a heat exchange system containing a water-based heat exchange fluid, said formulation containing (1) a plant root powder, (2) a glycol which has a flash point greater than about 220° F. and which is completely miscible in the water present in the formulation, and (3) water, wherein the plant root powder remains readily dispersible after prolonged storage prior to being used in the heat exchange system.

Still another object is to provide an essentially oil-free, shelf-stable, stop-leak formulation for use in the cooling system of a motor vehicle, said formulation containing
  (1) 1 to 50 parts by weight of a plant root powder, wherein the plant root is selected from the group consisting of ginger root, orris root, turmeric root, blood root, licorice root, poke root, and sarsaparilla root, and mixtures thereof;
  (2) 20 to 80 parts by weight of a glycol, wherein the glycol is selected from the group consisting of diethylene glycol, ethylene glycol, propylene glycol, dipropylene glycol, polyglycols, glycol ethers, and mixtures thereof; and
  (3) 100 parts by weight water,
wherein the plant root powder remains as a loose flocculant which is readily dispersible in the glycol and water mixture even after significant storage before the formulation is added to the cooling system of the motor vehicle.

Still another object is to provide a method for stopping leaks in a motor vehicle cooling system containing a radiator and a water-based heat exchange fluid, said method comprising the steps of:
  (1) adding an effective amount of a stop-leak formulation to the water-based heat exchange fluid, wherein said stop-leak formulation contains
    (a) 1 to 50 parts by weight of a plant root powder, wherein the plant root is selected from the group consisting of ginger root, orris root, turmeric root, blood root, licorice root, poke root, sarsaparilla root, and mixtures thereof;
    (b) 20 to 80 parts by weight of a glycol, wherein the glycol is selected from the group consisting of diethylene glycol, ethylene glycol, propylene glycol, dipropylene glycol, polyglycols, glycol ethers, and mixtures thereof; and
    (c) 100 parts by weight water,
    wherein the plant root powder remains as a loose flocculant which is readily dispersible in the glycol and water mixture even after significant storage before the stop-leak formulation is added to the water-based heat exchange fluid; and
  (2) circulating the water-based heat exchange fluid containing the stop-leak formulation throughout the motor vehicle cooling system at the normal operating temperature of the motor vehicle cooling system, whereby the plant root powder is transported to leaks within the motor vehicle cooling system.

These and other objects and advantages will be apparent upon consideration of this specification and claims.

DESCRIPTION OF THE PREFERRED EMBODIMENTS

The stop-leak formulations of the present invention contain plant root powder, a glycol which has a flash point greater than about 220° F. and which is completely miscible in the water present in the formulation, and water. The stop-leak formulations may also contain corrosion inhibitors, lubricants, pour point depressants, dyes, and the like.

Suitable plant root powders include ginger root, orris root, turmeric root, blood root, licorice root, poke root, and sarsaparilla root. Mixtures of these plant root materials can also be used if desired. These materials, when present in powdered form in a water-based heat exchange system (e.g., an automobile cooling system), can "bridge" and effectively close or stop leaks in the system. The preferred plant root powder is ginger root powder. The plant root material should be in the form of small, essentially individual particles within the heat exchange system to effectively stop leaks therein. Pellets prepared from plant root powder, although not preferred, can be used if desired so long as the pellets will break down before or shortly after being added to an automobile cooling system. Suitable binders for such pellets include polyvinyl alcohols. Pellets, if used, generally break down into smaller particles shortly after the product is formulated. Formation of stop-leak pellets is not required for the practice of this invention. In fact, it is preferred that the plant root material included in the stop-leak formulations of the present invention is added directly as a powder. The avoidance of pellet formation and the associated manufacturing steps is an additional advantage of the present invention.

The plant root material can be derived, if desired, from pellets used in stop-leak formulations prepared in accordance with U.S. Pat. No. 2,935,189. Such pellets when used in the stop-leak formulations of the present invention are quickly broken down into particulates that settle as a loose flocculant. This flocculant can be readily dispersed by shaking the mixture by hand. Preferably such ground root pellets contain only limited amounts of soluble oil and are essentially oil free.

As just indicated, the plant root material should be in the form of a finely-divided powder. Generally it is preferred that the plant root material consists of particles in the size range of about 200 microns to about 2000 microns. Generally wide particle size ranges are preferred in order to effectively stop leaks of widely ranging sizes. Particles smaller and larger than this preferred range can be included so long as a significant majority of particles is within the cited range. Inclusion of significant amount of particles below about 200 microns will not significantly improve the stop-leak characteristics of the formulation. And inclusion of significant amount of particles well above 2000 microns might actually contribute to blockage of the radiator core.

Suitable glycols have a flash point of greater than about 20° F. and are completely miscible with the water present in the formulation. The glycols used should be noncorrosive to aluminum and other metals found within cooling systems and should not attack other components (such as rubber, cork, seals, and hoses) used with such cooling systems. Suitable glycols include diethylene glycol, ethylene glycol, propylene glycol, dipropylene glycol, polyglycols, and glycol ethers. The preferred glycol is diethylene glycol ($C_4H_{10}O_3$) due to its high flash point (290° F.), availability, and relatively low cost. Mixtures of glycols can also be used. It is also preferred that the glycol be selected so that the resulting stop-leak formulations have a sufficiently low freezing point so that they can be shipped during the winter. Generally, a polyglycol/water mixture will not have a freezing point sufficiently low so that it can be easily shipped during the coldest winter months. Polyglycols, due to their excellent lubricating properties, can be used to advantage in mixtures of other glycols that can provide the desired low freezing points. It is generally preferred that glycol ethers are not used as the only glycol in the formulation. Glycol ethers alone have a tendency to attack aluminum and rubber. But such glycol ethers can be used with other glycols to dramatically decrease the pour point of the formulation.

The third required component of the stop-leak formulations of the present invention is water. Preferably the water is distilled water or otherwise treated water in order to avoid potential mineral deposits within the cooling system.

In addition to the required components, the stop-leak formulations of the present invention can contain various other additives or supplements. For example, corrosion inhibitors or chelating agents may be added. Such additives can be used to sequester metallic ions (especially copper ions) which could plate to the aluminum blocks thereby resulting in corrosion. Conventional corrosion inhibitors as normally used in antifreeze systems can be used. The preferred corrosion inhibitors include benzotriazole, tolytriazole, and triazole derivatives. Such corrosion inhibitors, if used, should be present at a level of about 0.05 to 0.5 weight percent based on the total weight of the glycol/water mixture.

The present stop-leak formulations can also advantageously contain lubricating agents to effectively lubricate the bearings, seals, and other components found in, for example, the water pump. As those skilled in the art will realize, the glycols themselves may provide some lubricating effects. But in some instances it is desirable to add further lubricating agents. Conventional lubricating agents as normally used in antifreeze systems can be used. Preferred lubricating agents are phosphate esters. Examples of suitable phosphate esters include anionic or nonionic phosphate monoester or diester surfactants. Such phosphate esters are commercially available. Such lubricating agents, if used, should be present at a level of about 0.5 to 10 weight percent based on the total weight of the glycol/water mixture.

The present stop-leak formulation may also contain dyes if desired. Such dyes should be water soluble and compatible with the dyes or dye systems normally used in antifreeze systems. If desired, a fluorescent water-soluble dye can be used. Such a fluorescent dye could be used to detect and gauge any remaining leaks that are not repaired by the stop-leak formulation.

Other additives used in antifreeze products can also be added to the stop-leak formulations of the present invention if desired.

Generally the stop-leak formulations of the present invention contain from 1 to 50 parts by weight plant root powder, from 20 to 80 parts by weight glycol, and 100 parts by weight water as well as any desired additives (ie., corrosion inhibitors, lubricating agents, dyes, and the like). Preferred stop-leak formulations of the present invention contain from 15 to 30 parts by weight plant root powder, from 35 to 55 parts by weight glycol, and 100 parts by weight water as well as any desired additives. To prepare the present stop-leak formulations, the various components are simply mixed together to form a homogenous mixture. The mixture can then be packaged in individual, single-use containers suitable for use by the ultimate consumer. Care should be taken in filling the single-use containers that the ground plant root material remains homogeneously dispersed. Alternatively, the dry ground plant root material can be added directly to the individual, single-use containers and the mixture of glycol/water (alone with any additives) added directly to the containers. The plant root powder, although it will settle to the bottom of the container, can readily and easily be dispersed by simply shaking the container just before the contents are added to the cooling system. In other words, the plant material which settles to the bottom of the container does not form a non-dispersible, solid mass. Rather, the particles retain their individual identity and any binding between the particles can readily be broken by simply agitation.

It has generally been found that a ratio equal to or less than about one gram of plant root material to about eight milliliters of the glycol and water mixture is satisfactory and preferred. With increasingly higher ratios of plant root material to the liquid components, the plant root material may become more and more difficult to disperse and form the desired homogeneous suspension. Approximately 20 grams of plant root material is usually sufficient to treat a standard-sized automobile's cooling system.

The stop-leak formulations of the present invention are stable over long periods of time. For purposes of this invention, "stability" means that the particulate matter in the formulation can be readily dispersed by shaking the mixture and that such dispersed particles retain their ability to stop leaks in a water-based heat exchange system. Generally only gentle shaking will be required to disperse the plant root material and reform a homogenous mixture. After prolonged storage (ie., on the order of several years), more vigorous shaking may be required but the resulting homogenous mixture should work just as effectively as a stop-leak product. This is in direct contrast to prior art formulations containing plant root materials where, even after only relatively short storage times in the presence of only traces of water, the active ingredients cannot be re-dispersed and the effectiveness of the product is significantly reduced.

The following example is provided to illustrate the invention and not to limit it.

EXAMPLE

A stop-leak product was prepared by mixing ground ginger root powder (28 g) with diethylene glycol (70 g) and water (127.7 g). The following additives were also included: benzotriazole (0.3 g) as a corrosion inhibitor and phosphate ester (2.0 g) as a lubricating agent. The ginger root powder was in the form a pellet. Upon adding the liquid components, the pellet broke down into a loose flocculant generally containing particles in the range of about 250 to 1700 microns. The particles could be readily dispersed by simply shaking the mixture by hand with a gentle back and forth motion. The resulting formulation was effective as a stop-leak product for automobile cooling systems. This formulation had a freezing point of about −18° C. which should be sufficiently low to allow for shipment during the winter months.

To confirm the increased shelf life of the stop-leak products of this invention, samples of this material were stored at room temperature for extended periods of time. Periodically the samples were shaken by hand to determine if the ground ginger root powder remained readily dispersible. Even after storage for six months the ginger root powder remained readily and easily dispersible using only gentle hand shaking. For comparison purposes, a significant percentage of samples of prior art materials prepared in accordance with U.S. Pat. No. 2,935,189 formed generally non-dispersible solid masses over this same time period and were, therefore, no longer as effective as stop-leak formulations.

That which is claimed is:

1. An essentially oil-free, shelf-stable, aqueous stop-leak formulation for use in a heat exchange system consisting essentially of a water-based heat exchange fluid, said formulation containing (1) between about 1 to about 50 parts by weight of a plant root powder, (2) between about 20 to about 80 parts by weight of a glycol which has a flash point greater than about 220° F. and which is completely miscible in the water present in the formulation, and (3) 100 parts by weight water, wherein the plant root powder remains readily dispersible after prolonged storage prior to being used in the heat exchange system.

2. A stop-leak formulation as defined in claim 1, wherein the plant root powder can be readily dispersed in the water and glycol mixture by shaking the formulation.

3. A stop-leak formulation as defined in claim 2, wherein the plant root is selected from the group consisting of ginger root, orris root, turmeric root, blood root, licorice root, poke root, and sarsaparilla root.

4. A stop-leak formulation as defined in claim 3, wherein the plant root is ginger root.

5. A stop-leak formulation as defined in claim 2, wherein the glycol is selected from the group consisting of diethylene glycol, ethylene glycol, propylene glycol, dipropylene glycol, polyglycols, glycol ethers, and mixtures thereof.

6. A stop-leak formulation as defined in claim 3, wherein the glycol is diethylene glycol.

7. A stop-leak formulation as defined in claim 5, wherein the glycol is diethylene glycol.

8. A stop-leak formulation as defined in claim 6, wherein the formulation contains from 1 to 50 parts by weight plant root powder, from 20 to 80 parts by weight glycol, and 100 parts by weight water.

9. The aqueous stop-leak formulation as defined in claim 1, wherein the formulation consisting essentially of from 15 to 30 parts by weight plant root powder, from 35 to 55 parts by weight glycol, and 100 parts by weight water.

10. The aqueous stop-leak formulation as defined in claim 8, wherein the formulation contains from 15 to 30 parts by weight plant root powder, from 35 to 55 parts by weight glycol, and 100 parts by weight water.

11. The aqueous stop-leak formulation as defined in claim 9, wherein the formulation contains a corrosion inhibitor.

12. A stop-leak formulation as defined in claim 11, wherein the corrosion inhibitor is benzotriazole, tolytriazole, or a triazole derivative.

13. The aqueous stop-leak formulation as defined in claim 1, wherein the formulation further contains a lubricating agent.

14. A stop-leak formulation as defined in claim 13, wherein the lubricating agent is a phosphate ester.

15. The aqueous stop-leak formulation as defined in claim 1, wherein the formulation further contains a corrosion inhibitor, a lubricating agent, and a dye.

16. The aqueous stop-leak formulation as defined in claim 1, wherein the particle size of the plant root powder is in the range of about 200 to about 2000 microns.

17. A stop-leak formulation as defined in claim 8, wherein the particle size of the plant root powder is in the range of about 200 to 2000 microns.

18. An essentially oil-free, shelf-stable, aqueous stop-leak formulation for use in the cooling system of a motor vehicle, said formulation consisting essentially of
   (1) 1 to about 50 parts by weight of a plant root powder, wherein the plant root is selected from the group consisting of ginger root, orris root, turmeric root, blood root, licorice root, poke root, sarsaparilla root, and mixtures thereof;
   (2) 20 to 80 parts by weight of a glycol, wherein the glycol is selected from the group consisting of diethylene glycol, ethylene glycol, propylene glycol, dipropylene glycol, polyglycols, glycol ethers, and mixtures thereof; and
   (3) 100 parts by weight water, wherein the plant root powder remains as a loose flocculant which is readily dispersible in the glycol and water mixture even after significant storage before the formulation is added to the cooling system of the motor vehicle.

19. The aqueous stop-leak formulation as defined in claim 18, wherein the plant root is ginger root with a particle size of about 200 to 2000 microns, wherein the glycol is diethylene glycol, and wherein the formulation further contains a corrosion inhibitor and a lubricating agent.

20. The aqueous stop-leak formulation as defined in claim 18, wherein the formulation contains from 15 to 30 parts by weight plant root powder, from 35 to 55 parts by weight glycol, and 100 parts by weight water.

21. The aqueous stop-leak formulation as defined in claim 19, wherein the formulation contains from 15 to 30 parts by weight plant root powder, from 35 to 55 parts by weight glycol, and 100 parts by weight water.

22. A method for stopping leaks in a motor vehicle cooling system containing a radiator and a water-based heat exchange fluid, said method comprising the steps of:
   (1) adding an effective amount of an essentially oil-free, shelf-stable stop-leak formulation to the water-based heat exchange fluid, wherein said stop-leak formulation consists essentially of
      (a) 1 to 50 parts by weight of a plant root powder, wherein the plant root is selected from the group consisting of ginger root, orris root, tumeric root, blood root, licorice root, poke root, sarsaparilla root, and mixtures thereof;
      (b) 20 to 80 parts by weight of a glycol, wherein the glycol is selected from the group consisting of diethylene glycol, ethylene glycol, propylene glycol, dipropylene glycol, polyglycols, glycol ethers, and mixtures thereof; and
      (c) 100 parts by weight water,
      wherein the plant root powder remains as a loose flocculant which is readily dispersible in the glycol and water mixture even after significant storage before the stop-leak formulation is added to the water-based heat exchange fluid; and
   (2) circulating the water-based heat exchange fluid containing the stop-leak formulation throughout the motor vehicle cooling system at the normal operating temperature of the motor vehicle cooling system, whereby the plant root powder is transported to leaks within the motor vehicle cooling system.

23. The method as defined in claim 22, wherein the plant root is ginger root with a particle size of about 200 to 2000 microns, wherein the glycol is diethylene glycol, and wherein the formulation further contains a corrosion inhibitor and a lubricating agent.

24. A method as defined in claim 22, wherein the stop-leak formulation contains from 15 to 30 parts by weight plant root powder, from 35 to 55 parts by weight glycol, and 100 parts by weight water.

25. A method as defined in claim 23, wherein the stop-leak formulation contains from 15 to 30 parts by weight plant root powder, from 35 to 55 parts by weight glycol, and 100 parts by weight water.

* * * * *